United States Patent

Baiera et al.

Patent Number: 6,016,771
Date of Patent: Jan. 25, 2000

[54] PET TOY

[75] Inventors: Vincent A. Baiera, Brooklyn, N.Y.;
Jonathan Willinger, Tenafly, N.J.

[73] Assignee: J.W. Pet Company Inc., East Rutherford, N.J.

[21] Appl. No.: 08/931,692

[22] Filed: Sep. 16, 1997

[51] Int. Cl.[7] .................................................. A01K 29/00
[52] U.S. Cl. ........................................ 119/708; 119/707
[58] Field of Search ................................ 119/708, 707; D30/160

[56] References Cited

U.S. PATENT DOCUMENTS

| | | |
|---|---|---|
| D. 295,798 | 5/1988 | Boelke . |
| D. 411,357 | 6/1999 | Baiera et al. ........................ D30/160 |
| 1,699,308 | 1/1929 | Postings ................................. 119/708 |
| 2,096,078 | 10/1937 | Windson ................................ 119/708 |
| 2,833,244 | 5/1958 | Bohlman ............................... 119/708 |
| 4,517,922 | 5/1985 | Lind . |
| 4,940,018 | 7/1990 | Edling . |
| 5,148,769 | 9/1992 | Zelinger . |
| 5,322,036 | 6/1994 | Merino . |
| 5,575,241 | 11/1996 | Line ....................................... 119/708 |
| 5,675,225 | 10/1997 | Moore et al. ........................ 318/257 |
| 5,778,825 | 7/1998 | Krietzmen et al. ................. 119/708 |
| 5,881,679 | 3/1999 | Hann .................................... 119/708 |
| 5,924,387 | 7/1999 | Scramer ............................... 119/708 |

*Primary Examiner*—Jack W. Lavinder
*Assistant Examiner*—Judith A. Nelson
*Attorney, Agent, or Firm*—Helfgott & Karas, P C.

[57] ABSTRACT

A toy for pets to induce and maintain the interest of the pet without human participation. A movable support for suspending a toy character therefrom may be mounted in base member having a rounded bottom wall. In this manner when the toy character is batted by a pet both the support and base member move in random patterns acting to enhance the movement of the toy character. This enhanced random motion of the toy character is very effective in inducing and maintaining the interest of the engaged pet.

29 Claims, 5 Drawing Sheets

PET TOY

BACKGROUND OF THE INVENTION

1. Field of the Invention

The present invention relates generally to a toy device for the amusement and exercise of a pet and, in particular, to a pet toy having a base adapted to rock dynamically without capsizing the toy device. Suspended adjacent the base from a support means which is mounted to the base is a toy character for attracting the interest of a pet.

2. Description of Prior Developments

A variety of toy devices have been designed to entertain and exercise domestic pets. Such devices are particularly important in the case of the domestic cat. Because a domestic cat is primarily a house pet, the majority of the cat's activity including its play and exercise is conducted indoors. It is therefore important to provide a pet toy that is instinctively attractive to a cat such as to induce the cat to use the toy and thereby satisfy its need for exercise.

It is well known that pets and particularly cats are attracted to toy mice or other toy characters resiliently suspended by a line or other means. Such means have in the past been incorporated into stand alone devices having bases for seating the device on a flat surface such as the floor. The benefits of such devices are obvious in that they can be used by a pet at any time and more importantly do not require the cooperation of the pet owner.

While these devices have been effective, a problem that has been encountered with these stand alone devices is that if played with too aggressively the device may be overturned rendering the device useless.

Additionally it has been noted that the prior art devices have in general been designed to exhibit a limited range of motion. In particular the motion used to attract the pet has been limited to the random oscillations of the resilient suspended toy characters. In time, the pet will become bored with the limited motion and abandon the use of the toy. Consequently, the pets need for exercise will not be satisfied.

It is therefore desirable to have a stand alone pet toy which exhibits an array of movement and which may be modified to exhibit a different range of motion in order to maintain the interest of the pet.

Accordingly a need exists for a stand alone toy device which has a base adapted to randomly rock, a support means adapted to change position relative to the base and toy character which is resiliently suspended, so as to exhibit a wide range of motion.

A further need exists for a stand alone toy device which may not be capsized during use.

A still further need exists for a stand alone toy device which may be easily modified to exhibit a different range of motion in order to maintain the interest of a pet.

SUMMARY OF THE INVENTION

The present invention has been developed to fulfill the needs noted above and therefore has as an object the provision of a stand alone pet toy which has a curved base which permits the base to freely rock when the toy is being used.

Another object of the invention is the provision of a stand alone toy device having a toy character resiliently suspended adjacent the base by a support means which is adapted to exhibit a range of motion independent of the base and toy character.

Another object of the invention is the provision of a flange mounted to the base to prevent the pet toy from capsizing during use by a pet.

Yet another object of the invention is the provision of a base to which may be secured a variety of supporting means of similar dimensions from which may be suspended a variety of toy characters.

These and other objects are met by the present invention which includes a weighted base, a central modular support means connectable to the base, and a toy character suspended from a free end of the support means. The base is adapted to rock back and forth when the device is in use and is further provided with a radially expanding flange which prevents the rocking base from tipping over.

The base is adapted to be able to easily receive multiple embodiments of the modular support means. The interconnection between the base and the support means is preferably a friction-fit connection that is easily effected by hand.

The modular support means are adapted to offer different ranges of motion and may have suspended therefrom different types of toy characters.

The aforementioned objects, features and advantages of the invention will, in part, be pointed out with particularity, and will, in part, become obvious from the following more detailed description of the invention, taken in conjunction with the accompanying drawings, which form an integral part thereof.

DETAILED DESCRIPTION OF THE PREFERRED EMBODIMENTS

The present invention will now be described in conjunction with the drawings beginning with FIG. 1 which depicts a pet toy assembly 10 constructed in accordance with a first embodiment of the invention. The pet toy assembly 10 includes a base 12, a support means 14 which is mounted to the base 10, and a toy character 16 which is suspended from the support means 14.

The base 12, and support means 14 are preferably made of a resilient, non-destructive, lightweight plastic material. In this manner, the pet toy 10 can be played with aggressively without threat of injury to the pet or damage to the pet toy 10 or personal property of the pet owner.

Details of the pet toy 10 are shown in FIGS. 1–4 wherein the support means 14 of the first embodiment is shown as comprising a substantially rigid mast 20 which extends vertically upward from the base 12, an elongated arm 22 which extends substantially perpendicular to the mast 20, and a hollow housing 26 for rotatably connecting the arm 22 to the mast 20.

Figure 2:
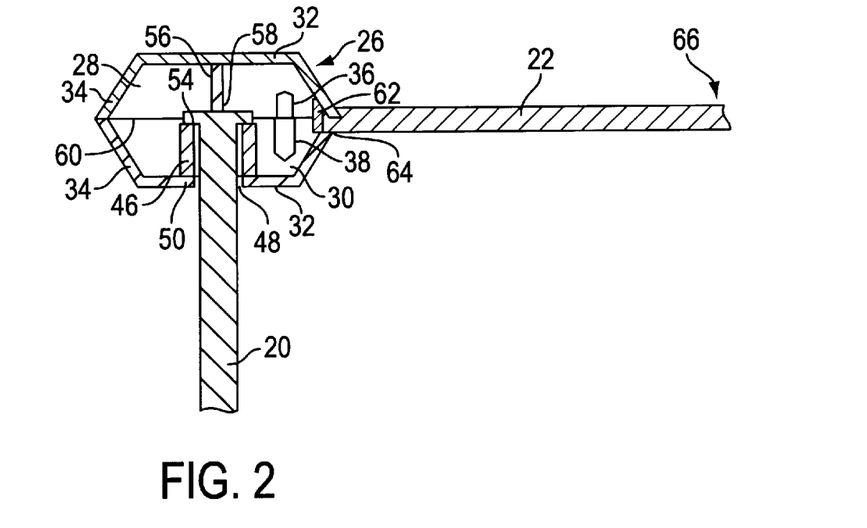
FIG. 2 is a sectional view of a portion of the pet toy of FIG. 1.
Figure 3:
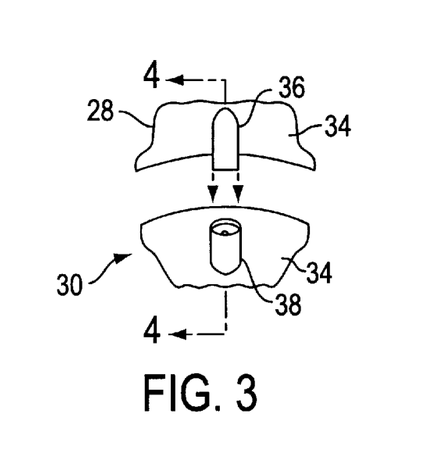
FIG. 3 is fragmental view of the housing of FIG. 2.
Figure 4:
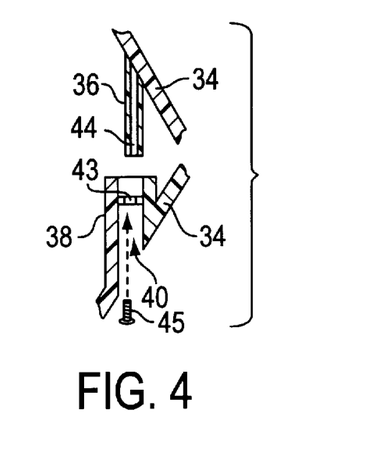
FIG. 4 is a sectional view taken along line 4—4 of FIG. 3.

The housing 26 further comprises complementarily shaped upper and a lower plates 28,30 which are joined together to form the housing 26. Each of the plates 28,30 includes a circular floor 32 surrounded by a sloping side wall 34, the housing 26 having generally the shape of a conic section.

As shown in FIGS. 2–4, depending vertically from the sidewall 34 of the upper plate 28 into the interior of the housing are a plurality of pegs 36. For each of the pegs 36, a corresponding socket 38 is provided which extends upwardly from the sidewall 34 of the lower plate 30 and which is axially aligned with one of the plurality of pegs 36.

Within the center of each socket 38 is provided an axial hole 40 which extends through the side wall 34 of the lower plate 30. The hole 40 is dimensioned to have a diameter larger than the diameter of the pegs 36. In this manner, when the upper and lower plates 28,30 are connected each of the pegs 36 are inserted within the hole 40 of each of the corresponding sockets 38.

As shown further in FIG. 4, the hole 40 is intersected by a transverse wall 42 which includes a central opening 43. The central opening is axially aligned with a bore 44 which extends through the center of each of the pegs 36. A screw 45 may be used to fasten each of the pegs 36 to each of the sockets 38 thereby securing the lower plate 28 to the upper plate 30. It should be noted, that other suitable methods such as gluing and welding may be employed to secure the upper and lower plates 28,30.

The lower plate 30 further comprises a cylindrical vertical sleeve 46 which extends upwardly from the floor 32 into the interior of the housing. A corresponding opening 48 is provided through the floor which is axially aligned with the sleeve 46. The sleeve 46 and the opening 48 define an annular bore 50 which extends upwardly through the floor 32, and continues axially within the sleeve 46 into the interior of the housing 26.

To assemble the housing 26 the mast 20 is first inserted within the bore 50 from the top of the sleeve 46, prior to connecting the upper and lower plates 28,30. The mast 20 is comprised of elongated ribs 52 which extend along the length of the mast 20 and are integral with the mast 20. The cross section or diameter of the mast 20 is at its widest point between the ribs 52 is smaller than the diameter of the bore 50. In this manner the mast 20 is free to slide axially along its length within the bore 50.

Once assembled, the housing 26 is prevented from being slipped off the mast 20 by the provision of a circular mast head 54 disposed at the upper end of the mast 20. The head 54 is dimensioned to have a diameter slightly larger than the diameter of the annular bore 50.

The mast head 54 further serves to support a pivot shaft 56 which depends from the center of the upper plate 28 and extends into the interior of the housing. The head 54 provides a horizontal bearing surface upon which the end 58 of the pivot shaft 56 is permitted to rotate. A sheet of glossy material (not shown) having a low coefficient of friction may be applied to the head 54 to reduce the friction between the end 58 and the head 54 and thereby enhance the rotation of the pivot shaft 56 relative to the mast 20.

As shown in FIG. 2, the pivot shaft 56 which is preferably integrally molded to the housing 26 acts to support and center the housing 26 on the mast head 54. The provision of the pivot shaft 56 in cooperation with the loose fit of the mast 20 within the bore 50 permits the housing 26 and the extending arm 22 to be rotated freely about the mast 20.

As further shown in FIG. 2, the arm 22 is preferably molded to the side wall 34 of the upper plate 28 adjacent the plate border 60 and has a portion 62 which extends below the border 60 and into the interior of the housing 26. Although shown as integrally molded, the cross piece 22 may be cantilevered from the housing 26 such as by heat welding or other conventional means.

To accommodate the portion 62 of the arm 22 which extends below the border 60, the lower plate 30 is provided with a correspondingly shaped notch 64 which is cut out of the side wall 34 adjacent the border 60 and below the arm 22. In the assembled housing 26, the arm 22 is recessed within the notch 64 which allows the borders 60 of the upper and lower plates 28,30 to meet squarely.

To induce the pet to rotatably drive the arm 22 and the housing 26 about the mast 20, the toy character 16 is suspended from the outer end 66 of the arm 22 which extends beyond the perimeter of the housing. An elastic tether or cord 68 may be used to suspend the toy character 16 in order to enhance the deflection and displacement of the character 16 when acted upon by a pet.

The opposite ends of the elastic tether 68 may be fastened to the outer end 66 of the cross piece 22 and to the toy character 16 by tying gluing or stapling. Alternatively, the cross piece 22 may be provided with a bore 69 which extends vertically through the cross piece 22 adjacent the outer end 66 of the cross piece 22. In this manner the tether 68 may be suspended within the bore by tying a knot in one end of the tether 68 which has a diameter greater than the diameter of the bore.

Figure 1:
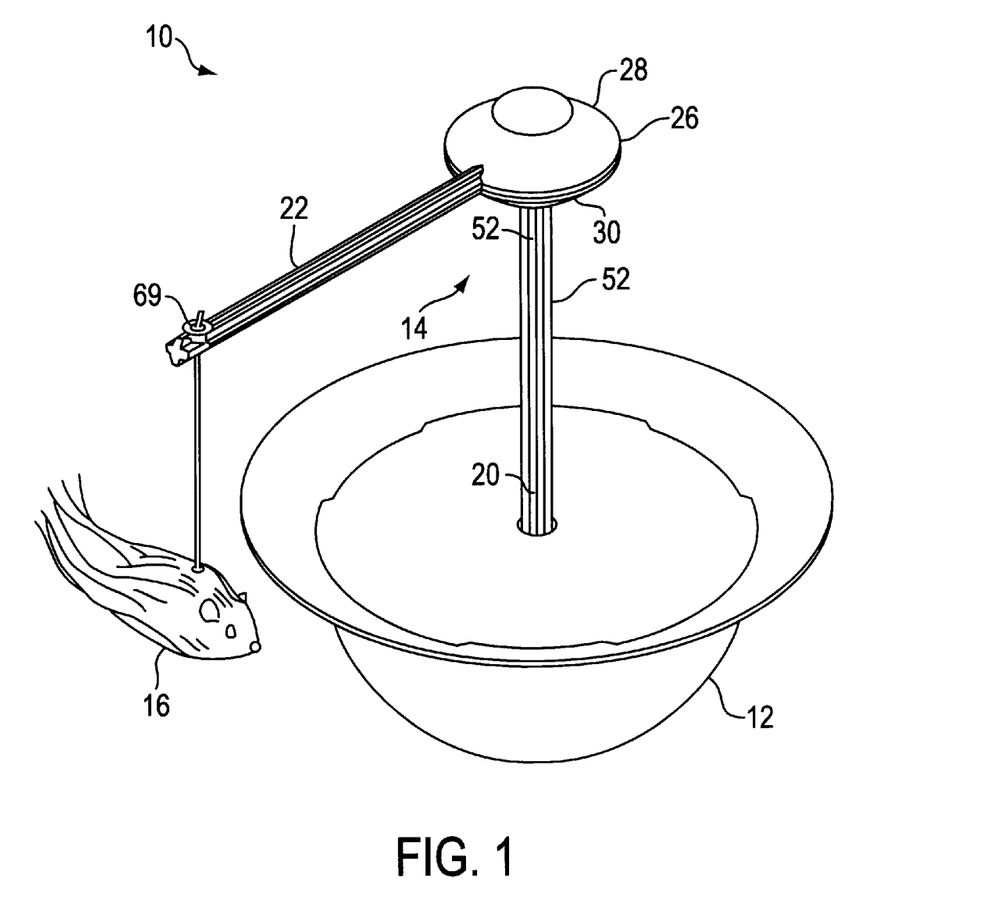
FIG. 1 is a perspective view of a first embodiment of a pet toy constructed in accordance with the present invention.

As shown in FIG. 1, with the support means 14 mounted to the base 12, the toy character 16 is suspended outside the perimeter of the housing 26 just above the base 12. In this manner the toy character 16 is free to rotate about the mast 20 without interference from the base 12.

Figure 5:
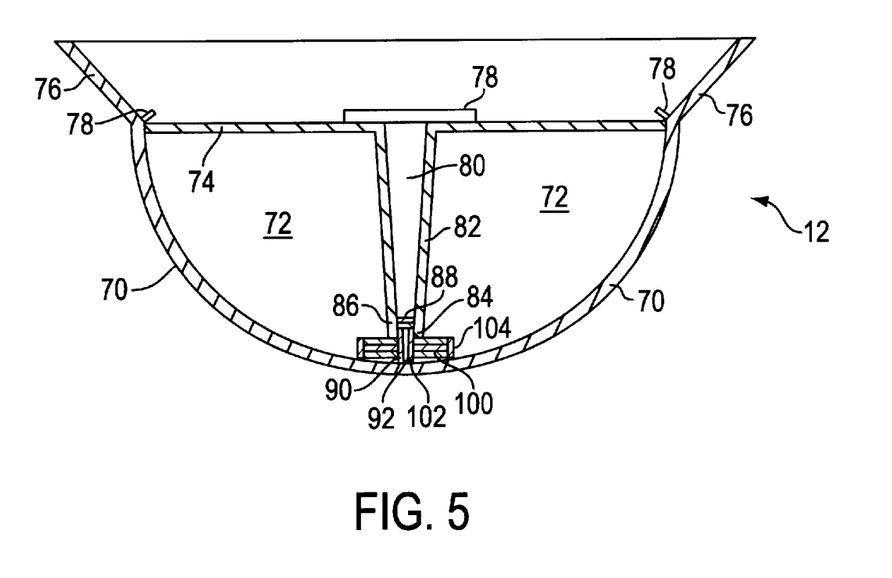
FIG. 5 is a sectional view of the base constructed in accordance with the present invention.

The base 12 as shown in FIG. 5, comprises a hemispherical bottom wall 70 having a substantially hollow interior 72 which is closed off by a generally horizontal top wall 74. Adjacent the junction of the bottom wall 70 and the top wall 74, the base further includes an annular flange 76 which expands or flares radially upward from the bottom wall 70 and has a diameter larger than the diameter of the open mouth of the bottom wall 70 and circumferentially surrounds the bottom wall around the open mouth.

In this manner, a toy 10 which is rocked aggressively in one direction such as to overcome the tendency of the hemispherical base to rock the device into the upright position, is prevented from tipping over by the provision of the flaring flange 76. In practice, the toy 10 which has been rocked aggressively in one direction causes the flange 76 to strike the supporting surface which initiates a counterforce which then acts to drive the toy 10 in the upright direction. The hemispherical bottom wall 70 then gradually rocks the toy 10 until the toy 10 has settled again in the upright position.

As further shown in FIG. 5, the top wall 74 is generally circular and is press fit within the open mouth of the bottom wall 70. A plurality of circumferentially spaced elongated ledges 78 are provided along the interior of the base 12 adjacent the junction of the flange 76 and the bottom wall 70. Each of the ledges 78 extends laterally toward the center of the base 12. Once the top wall 74 is press fit within the mouth below the ledges 78, the ledges 78 act as a barrier preventing the top wall 74 from being separated from the bottom wall 70.

Although the top wall 74 is shown as recessed within the interior of the base 12 and joined to the bottom wall below the flange 76, the location of the top wall does not affect the operation of the flange 76. As a result, the diameter of the circular top wall 74 may be enlarged and joined to the base 12 above the bottom wall 74 anywhere along the height of the flange 76.

Again referring to FIG. 5, the top wall 74 is further provided with a bore 80 which extends axially through the center of the top wall 74 within a vertical bore wall 82 which depends from below the top wall 74 into the interior 72 of the base 12.

Adjacent the bottom end 84 of the bore wall 82 the axial bore 80 is intersected by a transverse wall 86. The transverse wall is generally circular and has a circular aperture 88 which extends through the center of the transverse wall 86.

As further shown in FIG. 5, the base further comprises a peg 90 which projects vertically upward from the bottom wall 70 into the interior 72 of the base 12 and which is axially aligned with the bore wall 82. The peg 90 is dimensioned to have a diameter such that when the top wall 74 is seated in the open mouth of the bottom wall 70 the peg mates within the lower section of the bore wall 82 until the top of the peg 90 abuts the transverse wall 86.

In order to further secure the top wall 74 to the bottom wall 70, the peg 90 may also be provided with an axial hole 92. In this manner the peg 90 may be secured to the transverse wall 86 by a screw which inserted within the bore 80 and driven through the aperture 88 and screwed into axial hole 92 of the peg 90 thereby securing the top wall 74 to the bottom wall 70.

A ballast including sand, cement or any other suitable material is disposed within the interior 72 of the base 12 in order to weight the toy 10 and to position the center of gravity of the toy 10 within the interior of the base 12 below the support means 14. In this manner the ballast material counteracts the tendency of the extending arm 22 and suspended toy character 16 to keel the toy device in the direction of the toy character 16.

Preferably a plurality of flat metal disks 100 each having a central opening 102 are used as the ballast material. The disks 100 are accommodated concentrically about the peg 90 one on top of the other and are surrounded by a support wall 104 which is concentric with the peg 90 and the disks 100. In this manner the center of gravity is substantially fixed adjacent the lowest point of the bottom wall 70.

With the base 12 assembled and the disks 100 in place, the support means 22 may be joined to the base 12. To join the support means 22, the lower end of the mast 20 is snugly fitted through the top wall 74 and within the bore wall 82. The bore wall 82 may be dimensioned to have a diameter which gradually tapers toward the bottom end 84 of the bore wall. In this manner the support means is centered in the base 12 and snugly supported by the bore wall 82.

In operation, a pet may swat, pull or simply brush against the toy character 16 causing the cross piece 22 and the suspended character 16 to freely orbit about the mast 20. As a result of the stresses to the elastic tether 68, the more rigorous the contact with the character 16 the greater the displacement and deflection of the character 16.

The resulting action of the character 16 in turn initiates a corresponding action in the base 12. In general the action of the character will cause the base 12 to rock and/or spin relative to a fixed point on the surface on which the toy 10 has been seated. In this manner the pet is entertained by the complex movements exhibited by the character 16 and the base 12.

A second embodiment is depicted in FIGS. 6–9, wherein the embodiment includes a pet toy assembly 10 similar to that already discussed with the base 12 and a support means having a mast 110, an elongated arm 112, and a housing 114 for connecting the arm 112 to the mast 110. As in the first embodiment, the mast is press fit within the bore wall 82 of the base 12. The mast 110 is dimensioned to have a diameter substantially identical to the diameter of mast 20 which permits the support means to be used with the same base 12.

Figure 6:
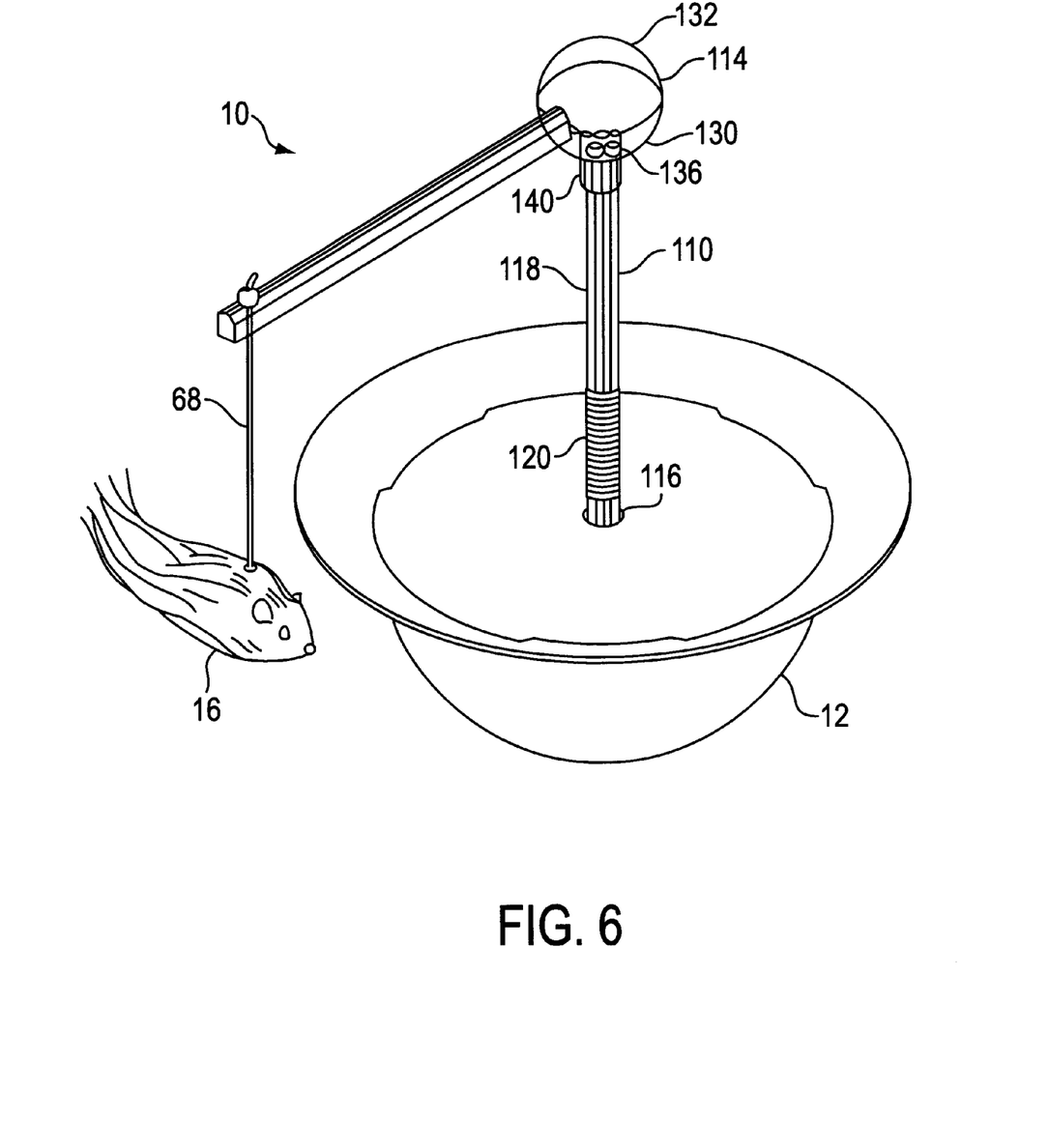
FIG. 6 is perspective view of a second embodiment of a pet toy constructed in accordance with the present invention.

The mast 110 further includes a lower and upper shaft 116,118 joined together by a coil spring 120. One end 122,124 of each of the lower and upper shafts 116, 118 is tapered to permit the shafts 116,118 to be press fit within the open ends of the coil spring 120.

As shown in FIG. 6, the housing 114 includes a pair of hemispherical shells 130,132 joined together to form a generally hollow sphere 134. The resulting sphere 134 is preferably transparent and may contain a plurality of colored beads 136 which are included to stimulate a pet aurally and visually. The shells 130,132 may be secured by gluing, heat welding or other conventional means.

Figure 7:
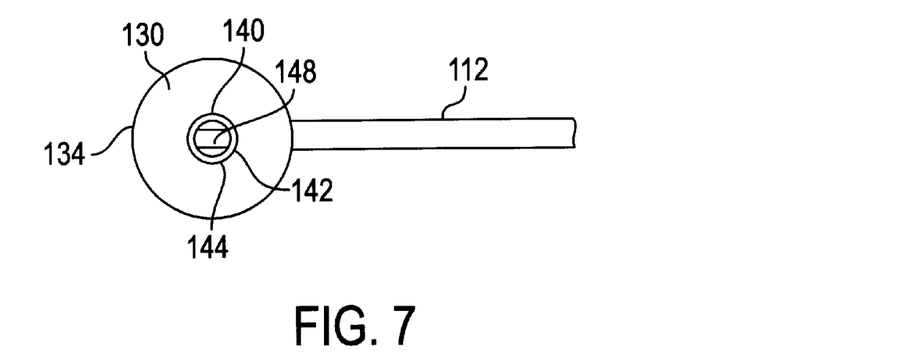
FIG. 7 is a plan view of a portion of the pet toy of FIG. 6.

The lower shell 130 includes a cylindrical collar 140 which depends vertically from the base 142 of the lower shell 130 and which defines an annular opening 144 into which is press fit the upper end of the mast 110. The base 142 of the shell 130 may be provided with an oblong opening 148 which is axially aligned with the annular opening 144 and which is adapted to accept an oblong abutment 150 provided on the upper end of the mast 110.

Figure 8:
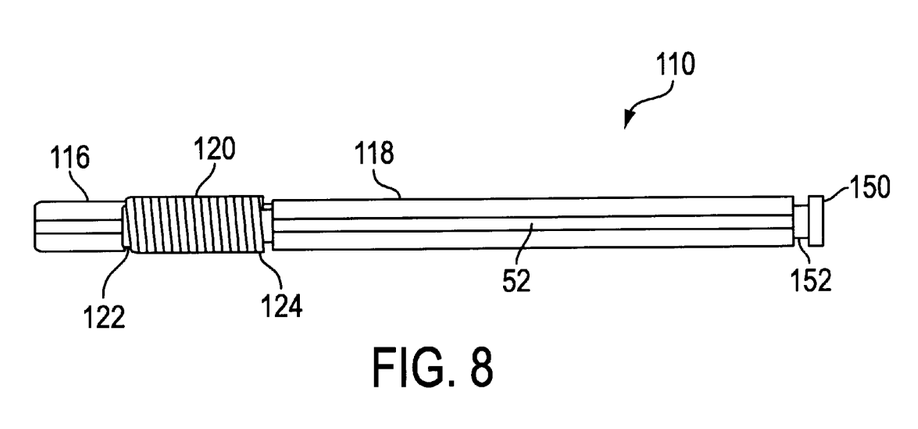
FIG. 8 is a plan view of a portion of the pet toy of FIG. 6.
Figure 9:
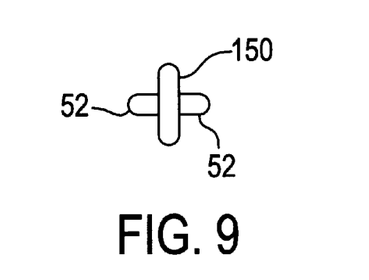
FIG. 9 is an end view of the portion of the pet toy of FIG. 8.

As shown in FIGS. 8 and 9, the abutment is supported by a neck 152 which extends from the shaft 110 and has a diameter which is narrower than the remainder of the shaft 110. The abutment 150 is dimensioned to have a shape substantially equivalent to the shape of the opening 148.

To connect the mast 110 to the housing 114, the upper end of the mast 110 is driven into the opening 144 until the abutment 150 is passed through the opening 148 and housed within the sphere 134 such that the neck 152 intersects the plane of the opening 148. With the abutment 150 within the sphere 134, the mast 110 may be rotated 360 degrees.

With the mast rotated 90 degrees, the abutment 150 is positioned transversally across the opening 148 which prevents the mast 110 from being separated from the housing 114 without again rotating the mast 110 by 90 degrees. In this manner the abutment 150 and neck 152 behave as a key which may be used to secure the housing 114 to the mast 110.

Cantilevered from the upper shell 132 adjacent the junction of the upper and lower shells 130,132 is the arm 112 which preferably extends outwardly beyond the perimeter of the base 12 and is substantially perpendicular to the mast 110. In order to support the arm 12, the lower shell 130 is provided with a cutout 154 which accommodates a portion of the arm 112. In this manner although arm 12 extends partially into the interior of the housing 114, the upper and lower shells 130,132 which comprise the housing 114 may meet squarely when joined. In operation, a pet may swat or tug the toy character 16 causing the character to bounce. If the character 16 is sufficiently displaced there may be placed sufficient stress on the coil spring 120 to flex the mast 110 and induce oscillations in the mast 110. Once set in motion the oscillation of the mast 110 result in still further displacement of the character 16. In turn, the action of the character and oscillating mast 110 induce a rocking and spinning motion in the base 12. The more rigorous the contact with the character 16 the greater the displacement and deflection of the base 12, character 16 or mast 110. The effect is a varied range of motion which maintains the pet's interest and encourages the pet to continue in its play.

It should be appreciated that the base as disclosed herein permits many adaptations to the overall configuration of the toy. Any number of differently styled and shaped supporting means and toy character may be used to entice a pet. For example a simple resilient member having a toy character mounted thereto may be used in lieu of the means shown herein.

Although the preferred embodiments have been shown herein as comprising a elements which are adapted to be assembled and disassembled, it should be appreciated that such modularity is also for convenience of shipping, packaging and storage and may be modified such that the some or all of the elements are preassembled.

There has been disclosed heretofore the best embodiments of the invention presently contemplated. However, it is to be understood that various changes and modifications may be made thereto without departing from the spirit of the invention.

What is claimed is:

1. A pet toy comprising:
    a base member having a rounded bottom wall defining an open mouth;
    a top wall joined to said bottom wall for closing off the interior of said base;
    a radially flaring annular flange joined to said bottom wall and extending upwardly therefrom and circumferentially surrounding said bottom wall and said open mouth so as to prevent said base from tipping over;
    a support means connected at a first end to said top wall and extending upwardly and outwardly to a free end; and
    a toy character mounted to said free end.

2. The pet toy of claim 1 further comprising an elastic tether for mounting said toy character to said free end of said support means.

3. The pet toy of claim 1, wherein said support means further comprises a resilient member.

4. The pet toy of claim 1, wherein said support means comprises a mast extending upwardly from the center of said top wall, a housing mounted to an upper end of said mast, and an arm connected at a proximate end to said housing and extending to said free end substantially perpendicular to said mast.

5. The pet toy of claim 4, wherein said housing is rotatably mounted to said upper end of said mast.

6. The pet toy of claim 4, wherein said housing further comprises a generally hollow sphere, said sphere having a collar for fixedly mounting said sphere to said upper end of said mast.

7. The pet toy of claim 1 wherein said top wall is substantially flat and recessed within said base along said flange.

8. The pet toy of claim 7 wherein said top wall further comprises a central bore which extends substantially vertically into the interior of the base and within which is press fit said support means.

9. The pet toy of claim 1 further comprising ballast material disposed within said base.

10. A pet toy comprising:
    a base member having a rounded bottom wall and a top wall joined to said base for closing off the interior of said base;
    a mast rigidly connected to the center of said top wall and extending upwardly therefrom;
    a housing mounted to and surrounding an upper end of said mast;
    an elongated arm connected at a proximate end to said housing and extending away from said housing;
    a rotating connection provided within said housing and rotatably connecting said arm to said mast; and
    a toy character suspended from an outer end of said arm.

11. The pet toy of claim 10 wherein said housing further comprises an upper and lower plate removably connected and wherein said arm is mounted to said upper plate of said housing.

12. The pet toy of claim 11 wherein said lower plate has a central collar having a bore for rotatably mounting said housing to said upper end of said mast.

13. The pet toy of claim 10 wherein said housing further comprises a generally hollow sphere, said sphere further comprising a vertically depending collar for mounting said sphere to said upper end of said mast.

14. The pet toy of claim 13 wherein said housing further comprises a plurality of beads.

15. The pet toy of claim 10 further comprising an elastic cord for suspending said toy character.

16. The pet toy of claim 10 further comprises at least one metal disk disposed within said base for use as a ballast material.

17. The pet toy of claim 16 wherein said bottom wall further comprises a peg extending vertically upward into the interior of said base and wherein said at least one metal disk is disposed concentrically about said peg.

18. The pet toy of claim 10 further comprising a radially flaring flange joined to said top wall and extending upwardly therefrom.

19. The pet toy of claim 18 wherein said top wall is joined to said bottom wall along said flange.

20. The pet toy of claim 10 further comprising a plurality of ledges disposed within the interior of said base for securing said top wall to said base.

21. A pet toy comprising:
    a base member having a rounded bottom wall and a top wall joined to said base for closing off the interior of said base;
    a radially outwardly flaring annular flange joined to and surrounding said bottom wall and extending upwardly therefrom to prevent said base from tipping over;
    a mast rigidly connected to the center of said top wall and extending upwardly therefrom;
    a hollow housing mounted to and enclosing an upper end of said mast;
    an elongated rigid arm rotatably connected at a proximate end within said housing and extending away from said housing; and
    a toy character suspended from an outer end of said arm.

22. The pet toy of claim 21 wherein said mast is comprised of an upper and lower shaft joined together by a resilient member.

23. A pet toy comprising:
    a base member having a rounded bottom wall;
    a top wall joined to said bottom wall for closing off the interior of said base;

a radially flaring flange joined to said bottom wall and extending upwardly therefrom;

a support means connected at a first end to said top wall and extending upwardly and outwardly to a free end;

a toy character mounted to said free end;

wherein said support means comprises a mast extending upwardly from the center of said top wall, a housing mounted to an upper end of said mast, and an arm connected at a proximate end to said housing and extending to said free end substantially perpendicular to said mast, and wherein said housing further comprises a generally hollow sphere having a collar for fixedly mounting said sphere to said upper end of said mast.

24. A pet toy comprising:

a base member having a rounded bottom wall and a top wall joined to said base for closing off the interior of said base;

a mast rigidly connected to the center of said top wall and extending upwardly therefrom;

a housing mounted to an upper end of said mast;

an elongated arm connected at a proximate end to said housing and extending away from said housing; and a toy character suspended from an outer end of said arm, and wherein said housing further comprises an upper and lower plate removably connected and wherein said arm is mounted to said upper plate of said housing.

25. The pet toy of claim 24 wherein said lower plate has a central collar having a bore for rotatably mounting said housing to said upper end of said mast.

26. A pet toy comprising:

a base member having a rounded bottom wall and a top wall joined to said base for closing off the interior of said base;

a mast rigidly connected to the center of said top wall and extending upwardly therefrom;

a housing mounted to an upper end of said mast;

an elongated arm connected at a proximate end to said housing and extending away from said housing; and a toy character suspended from an outer end of said arm, and wherein said housing further comprises a generally hollow sphere, said sphere further comprising a vertically depending collar for mounting said sphere to said upper end of said mast.

27. The pet toy of claim 26 wherein said housing further comprises a plurality of beads.

28. A pet toy comprising:

a base member having a rounded bottom wall and a top wall joined to said base for closing off the interior of said base;

a mast rigidly connected to the center of said top wall and extending upwardly therefrom;

a housing mounted to an upper end of said mast;

an elongated arm connected at a proximate end to said housing and extending away from said housing;

a toy character suspended from an outer end of said arm; and at least one metal disk disposed within said base for use as ballast material and wherein said bottom wall further comprises a peg extending vertically upward into the interior of said base and wherein said at least one metal disk is disposed concentrically about said peg.

29. A pet toy comprising:

a base member having a rounded bottom wall and a top wall joined to said base for closing off the interior of said base;

a mast rigidly connected to the center of said top wall and extending upwardly therefrom;

a housing mounted to an upper end of said mast;

an elongated arm connected at a proximate end to said housing and extending away from said housing;

a toy character suspended from an outer end of said arm; and a plurality of ledges disposed within the interior of said base for securing said top wall to said base.

* * * * *